United States Patent [19]
Machado

[11] Patent Number: 5,992,254
[45] Date of Patent: Nov. 30, 1999

[54] GEAR-SHIFTING MECHANISM CONTROLLED AND COMMANDED BY A GOVERNING UNIT IN AN AUTOMATIC CONTROLLED WAY

[75] Inventor: Aryoldo Machado, Santa Barbara d'Oeste, Brazil

[73] Assignee: Eaton LTDA, Sao Paulo, Brazil

[ * ] Notice: This patent issued on a continued prosecution application filed under 37 CFR 1.53(d), and is subject to the twenty year patent term provisions of 35 U.S.C. 154(a)(2).

[21] Appl. No.: 08/919,423

[22] Filed: Aug. 27, 1997

Related U.S. Application Data

[63] Continuation of application No. 08/513,821, filed as application No. PCT/BR95/00002, Jan. 19, 1995.

[30] Foreign Application Priority Data

Jan. 31, 1994 [BR] Brazil ........................... 9400394

[51] Int. Cl.$^6$ ............................................. F16H 3/89
[52] U.S. Cl. ...................... 74/335; 74/339; 74/372
[58] Field of Search ........................... 74/335, 339, 371, 74/372

[56] References Cited

U.S. PATENT DOCUMENTS

| | | |
|---|---|---|
| 1,661,892 | 3/1928 | Girones . |
| 2,683,377 | 7/1954 | Schmid ..................... 74/371 |
| 2,928,290 | 3/1960 | Hosea et al. ............... 74/339 |
| 3,354,739 | 11/1967 | Ivanchich .................. 74/372 |
| 3,600,962 | 8/1971 | Ivanchich .................. 74/331 |
| 3,793,898 | 2/1974 | Espenschied et al. . |
| 4,544,057 | 10/1985 | Webster et al. . |
| 4,673,055 | 6/1987 | Yamaoka et al. ...................... 74/371 X |
| 5,214,974 | 6/1993 | Morbidelli . |
| 5,251,503 | 10/1993 | Morris et al. ........................... 74/335 X |
| 5,281,902 | 1/1994 | Edelen et al. .......................... 74/335 X |
| 5,404,768 | 4/1995 | Hwang et al. . |
| 5,433,125 | 7/1995 | Muller .................................. 74/335 X |
| 5,560,250 | 10/1996 | Hua ........................................... 74/371 |
| 5,660,079 | 8/1997 | Friedrich ............................... 74/335 X |
| 5,689,998 | 11/1997 | Lee ....................................... 74/372 X |

FOREIGN PATENT DOCUMENTS

| | | |
|---|---|---|
| 0310387 | 4/1989 | European Pat. Off. . |
| 0348622 | 1/1990 | European Pat. Off. . |
| 9405931 | 3/1994 | WIPO . |

*Primary Examiner*—Dirk Wright
*Assistant Examiner*—Peter T. Kwon
*Attorney, Agent, or Firm*—Ladas & Parry

[57] ABSTRACT

A gear shift mechanism in a transmission connecting a drive source to an output via a clutch. The gear shift mechanism acts on a plurality of gear pairs to select one thereof during a speed change when the clutch is disengaged. The gear shift mechanism has a hollow shaft which can be the input or output shaft of the transmission. One of the gears of the gear pairs are idly mounted on the hollow shaft and the other of the gears of the gear pairs are secured to the output shaft or a further shaft connected thereto. A locating tube rotates with the hollow shaft and is slidable therein. The locating tube and hollow shaft have a plurality of angularly aligned radial holes and when one of the idler gears of the gear pairs is selected for engagement, the locating tube is displaced to align the radial holes therein with holes in the selected idler gear. Each of the radial holes slidably supports an engagement pin. An axially displaceable actuator within the locating take engages inner ends of the engagement pins and displaces the pins to extended positions in driving engagement with the idle gear of the selected pair.

23 Claims, 13 Drawing Sheets

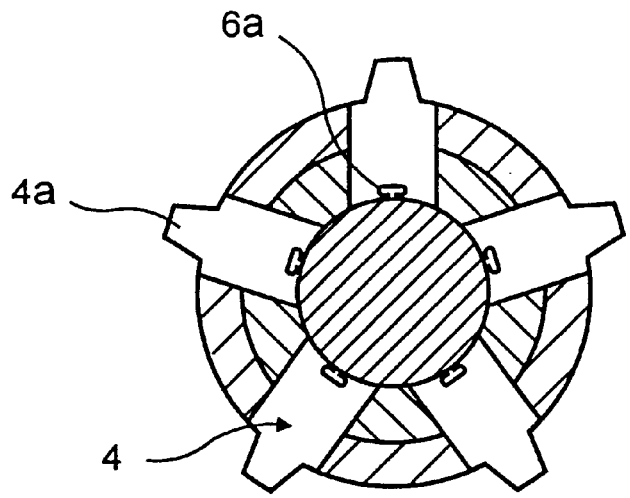
F I G. 1(A)1
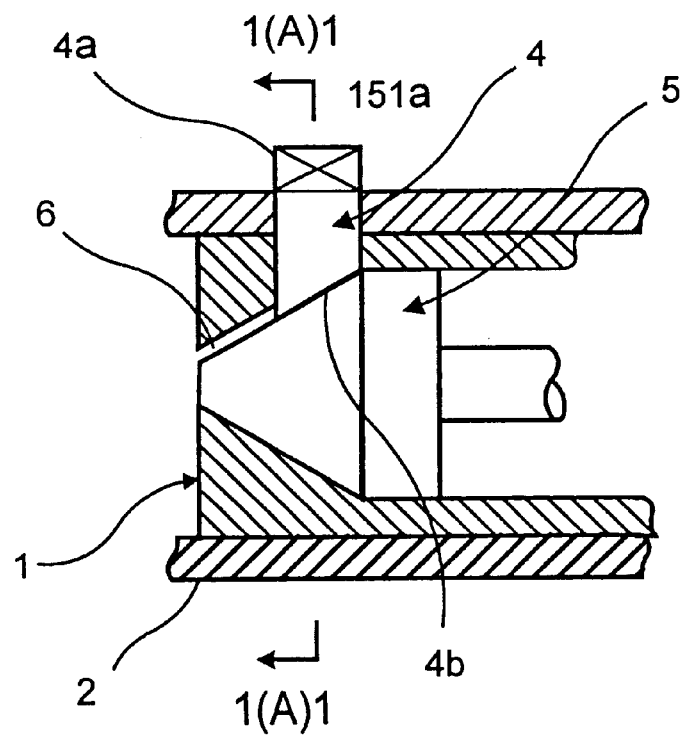
F I G. 1(A)2

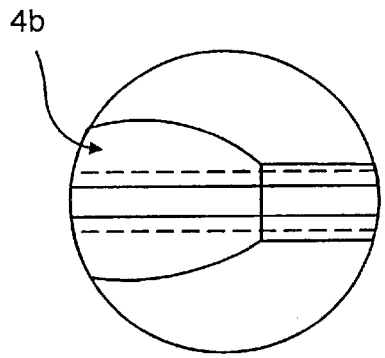
F I G. 1(B)3
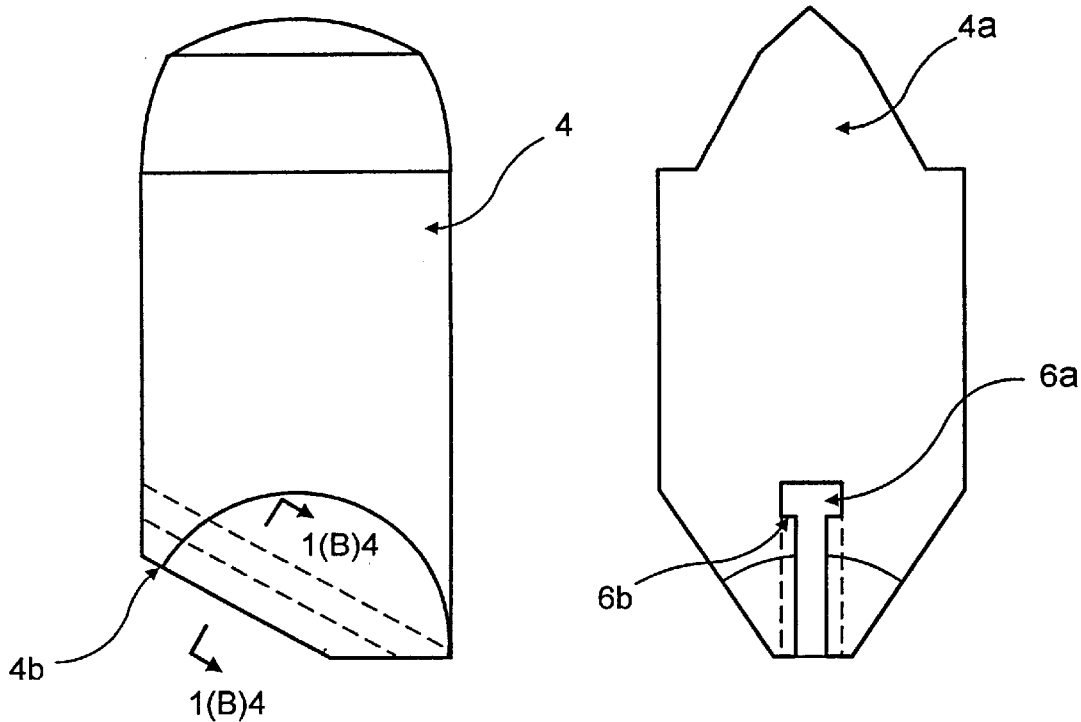
F I G. 1(B)1  F I G. 1(B)2
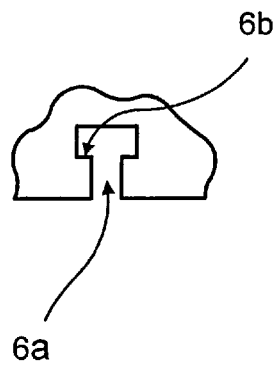
F I G. 1(B)4

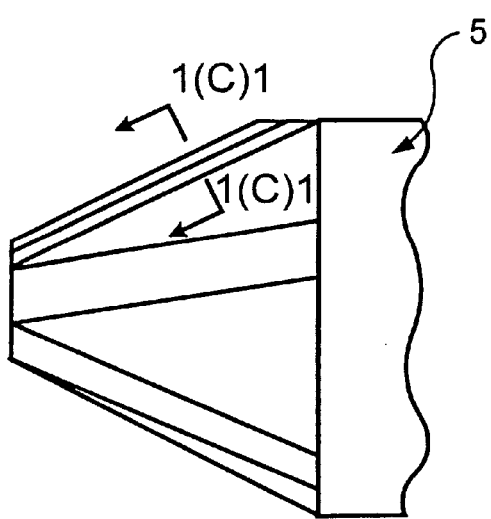
F I G. 1(C)1
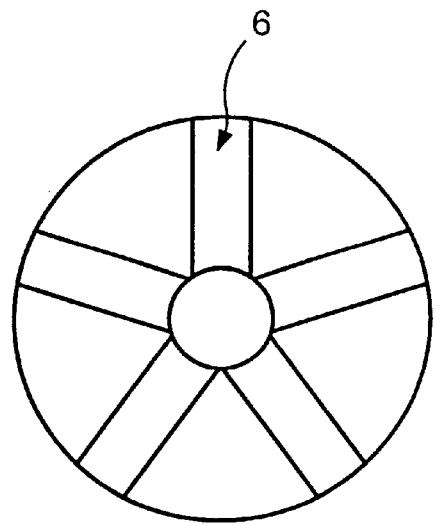
F I G. 1(C)2
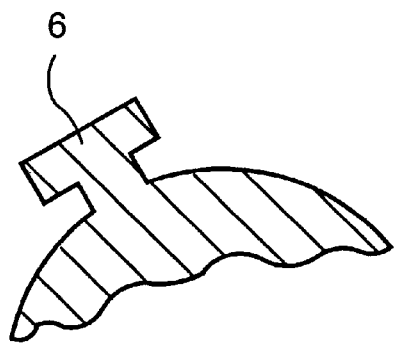
F I G. 1(C)3

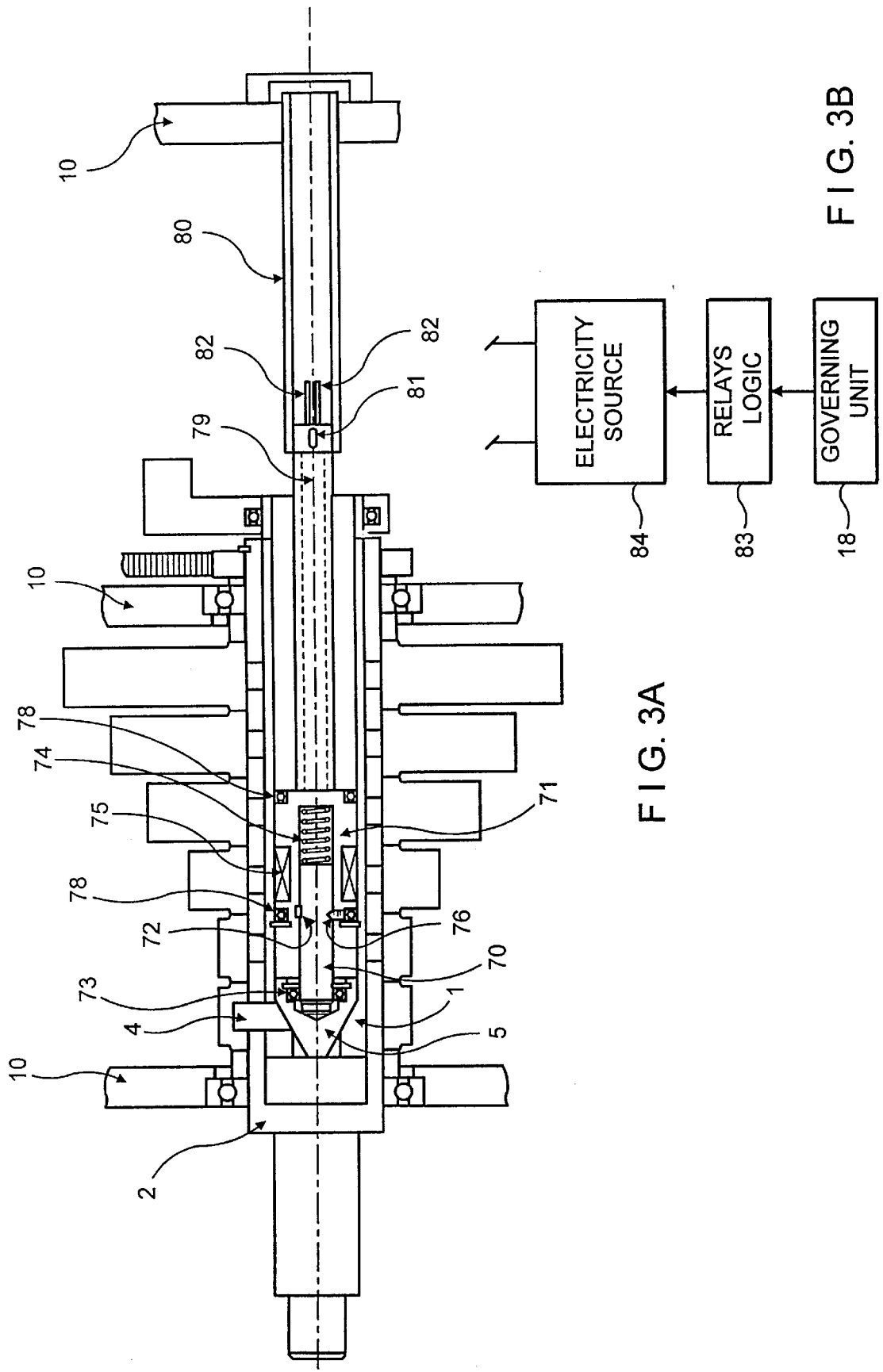

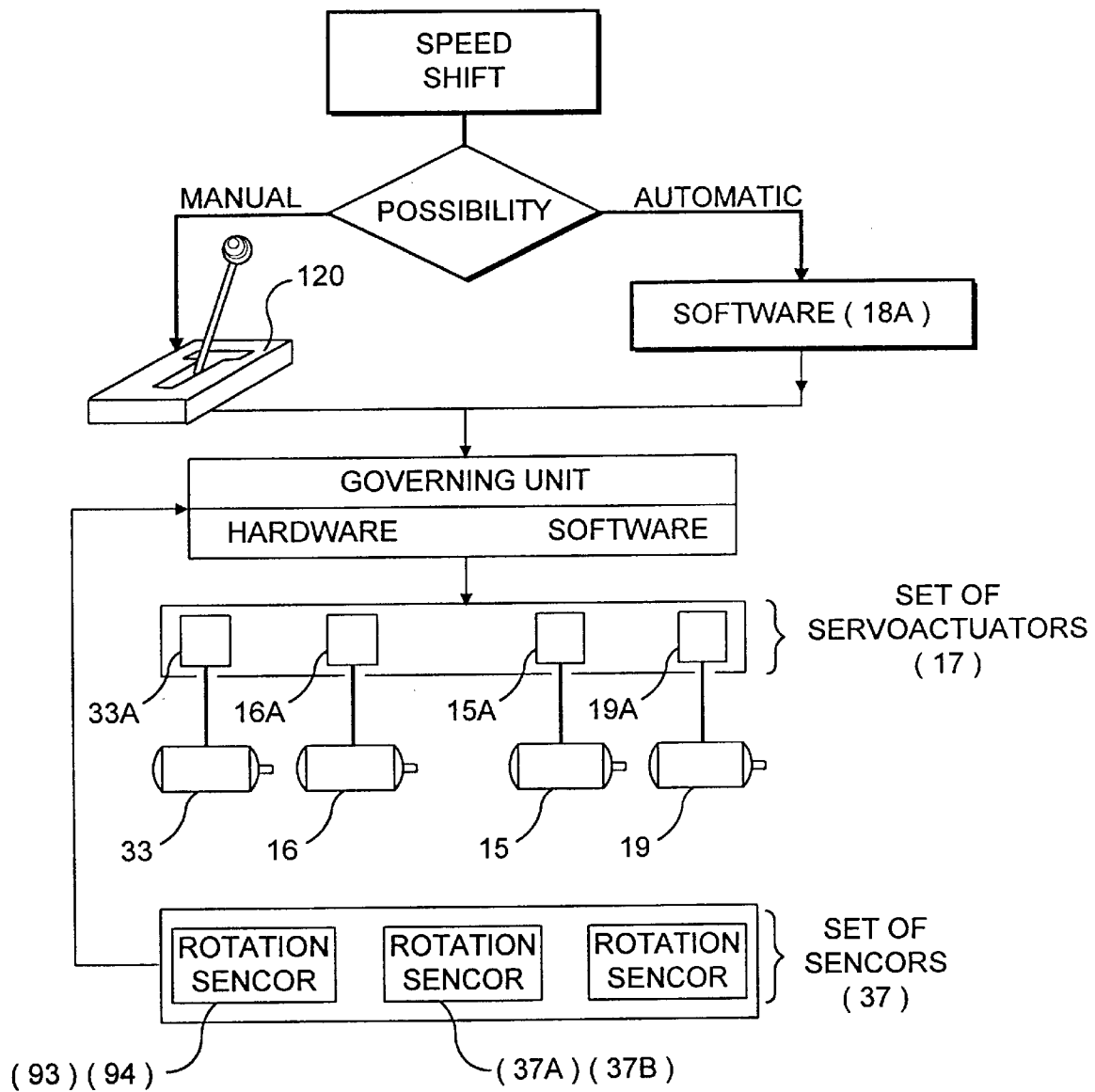
F I G. 6

GEAR-SHIFTING MECHANISM CONTROLLED AND COMMANDED BY A GOVERNING UNIT IN AN AUTOMATIC CONTROLLED WAY

This application is a continuation of copending application Ser. No. 08/513,821 filed on Oct. 11, 1995 which is International Application PCT/BR95/00002 filed on Jan. 19, 1995 and which designated the U.S.

FIELD OF THE INVENTION

The present invention relates to a gear-shifting mechanism controlled and driven by a governing unit automatically or manually. This mechanism actuates a respective one of a number of constantly meshed gear pairs by a shifting operation. One gear of each gear pair is on an input shaft and the other gear is on an output shaft.

BACKGROUND

Gear pair shafting mechanisms in a gear box are universally utilized in the form of a hub which is displaced on a splined shaft to engage a selected gear. The shifting mechanism can have a rotation synchronizing device to provide for the engagement without clashing of the teeth. During a speed change, i.e. a change of the selected gear pair for the operation, which change is made with the machine or vehicle running or moving, a synchronization of the movements of the parts of the transmission is required.

These mechanisms have been largely utilized in mechanical industries and in automotive transmissions. Mechanisms with synchronizing rings are largely used and well known. An example of such shifting mechanisms with synchronizing rings is disclosed in a publication of the SAE (Society of Mechanical Engineers) under number 680008, published in January, 1968.

SUMMARY OF THE INVENTION

The object of this invention is to provide a shifting mechanism actuating a clutch between the motor (engine) an d the transmission during gear shifting when a particular gear pair is selected. The shifting mechanism releases the clutch in order to permit the selection of the particular gear pair and when the selection of said gear pair is made, the shifting mechanism synchronizes the rotation of the rotary members which are active during operation and when synchronization is achieved, the shifting mechanism provides for the engagement of the selected pair for operation. Once this step is attained, the shifting mechanism causes the clutch between the motor (engine) and the transmission to be engaged and thus rotation and torque are now transmitted through the transmission to the output.

BRIEF DESCRIPTION OF THE FIGURES OF THE DRAWING

FIG. 1(A)1 is a sectional view taken along line 1(A)1–1(A)1 in FIG. 1(A)2.

FIG. 1(A)2 is an enlarged sectional view of a portion of the actuation means of the embodiment of FIG. 1.

FIG. 1(B)1 is a side, elevational view of an engagement pin of the actuating means.

FIG. 1(B)2 is an end elevational view of the engagement pin.

FIG. 1(B)3 is a top plan view of the engagement pin.

FIG. 1(B)A is a sectional view taken along line 1(B)4–1(B)4 in FIG. 1(B)1.

FIG. 1(C)1 is a side, elevational view of an actuating tip of the actuating means.

FIG. 1(C)2 is a front, end view of the actuating top.

FIG. 1(C)3 is a sectional view taken along line 1(C)3–1(C) 3 in FIG. 1(C)1.

FIG. 3A is a diagrammatic, longitudinal sectional view of a third embodiment of the invention.

FIG. 3B diagrammatically illustrates control means for operating the third embodiment.

FIG. 6 schematically illustrates the control means for operating the transmission.

DETAILED DESCRIPTION OF PREFERRED EMBODIMENTS

Figure 1:
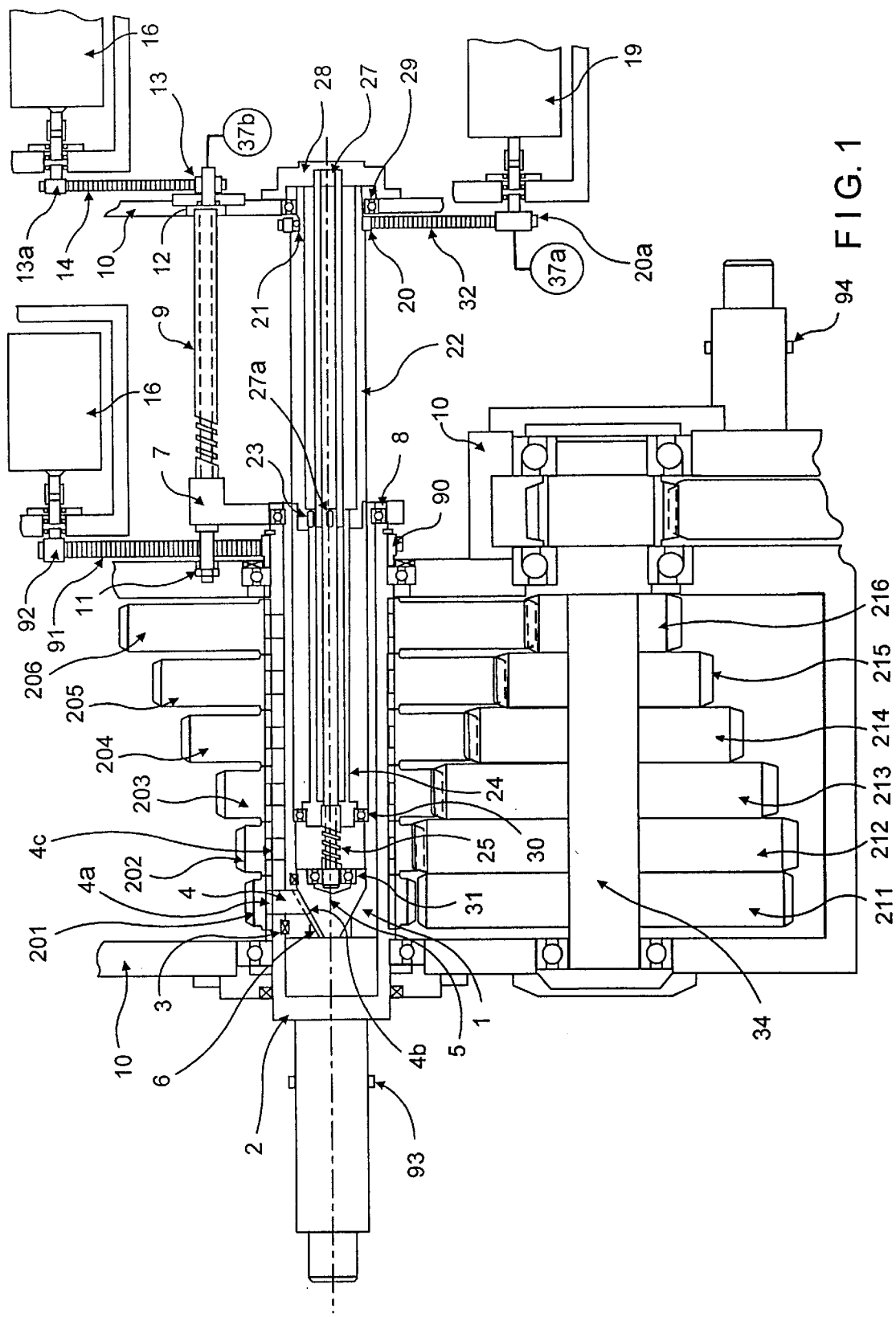
FIG. 1 is a diagrammatic, longitudinal, sectional view of a first embodiment of the transmission of the invention.

FIG. 1 shows a first embodiment of the gear shifting mechanism with constantly meshed gear pairs and its actuation means. The transmission has a main portion containing the constantly meshed gear pairs. One of the gears of each gear pair is slidably mounted on the hollow shaft 2 as idlers. These gears are designated by reference numerals 201, 202, 203, 204, 205, and 206. Mounted on a shaft 34 parallel to said hollow shaft 2 are the second gears of each gear pair constantly in mesh with gears 201–206. These second gears are designated by reference numerals 211, 212, 213, 214, 215 and 216 and are fixed to the shaft 34 to rotate therewith. Between the shaft 34 and the hollow shaft 2 is a gear shaft parallel to shafts 2 and 34 to enable reverse rotation for a specific gear pair. This arrangement of a rotation reversing shaft has been already employed in transmissions for vehicles in order to provide a reverse speed. Before the hollow shaft 2 as well as after the parallel shaft 34, many shafts as are necessary to the design can be present. The number of constantly meshed gear pairs depends upon the design and the application of the transmission.

Figures 2A, 2B:
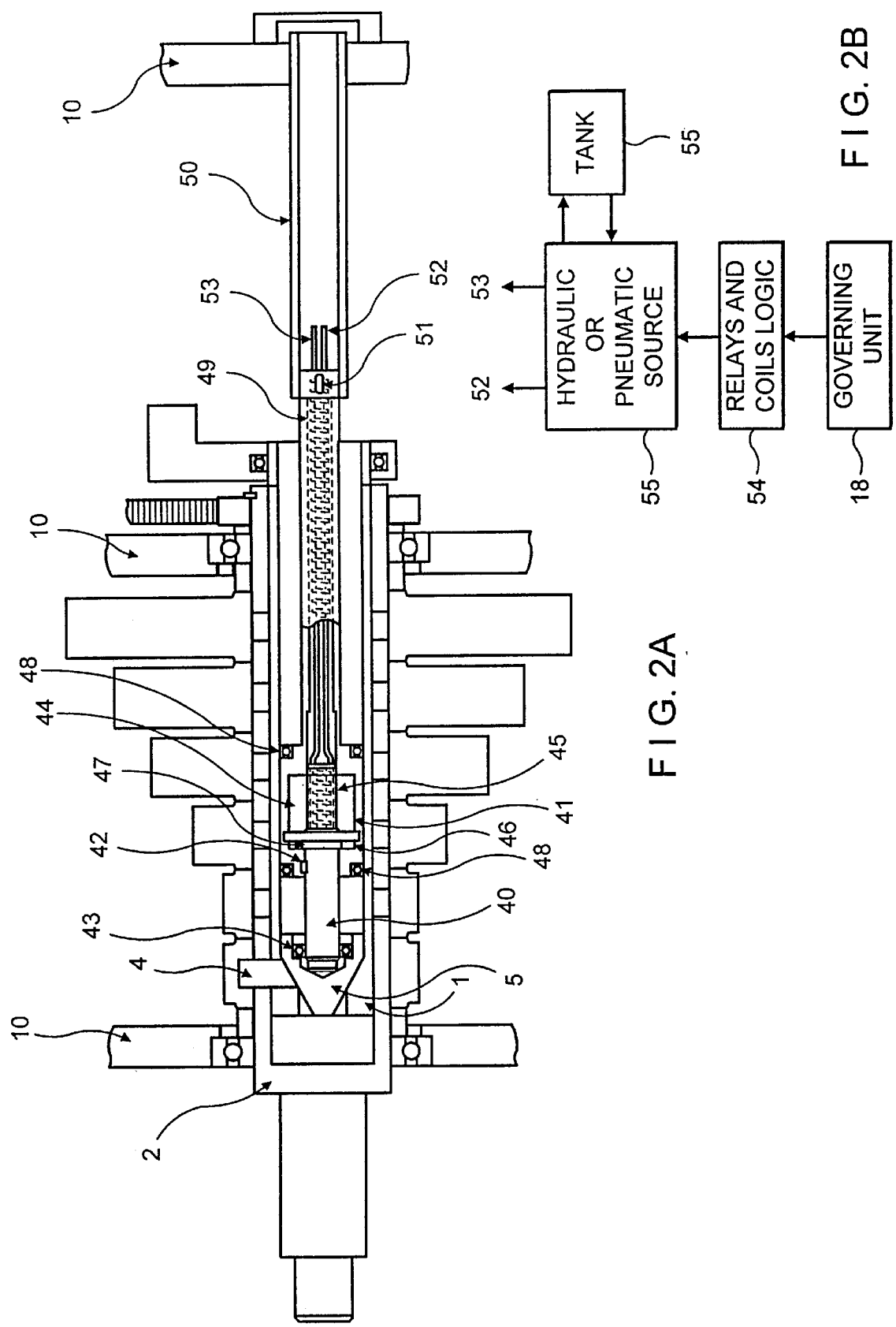
FIG. 2A is a diagrammatic, longitudinal, sectional view of a second embodiment of the invention.
FIG. 2B diagrammatically illustrates control means for operating the second embodiment.

FIG. 2A shows a variation of the engagement and disengagement mechanism when actuated by a hydraulic or pneumatic system driven and governed by a governing unit 18 operating in conjunction with a relay and coil logic 54 controlling an opening for the inlet of hydraulic fluid or compressed air.

FIG. 3A shows a variation of the engagement and disengagement mechanism when actuated by an actuation system through an electromagnetic solenoid 71 driven and governed by the governing unit 18 which acts on a relay logic 83 controlling the energization or de-energization of coil 75 of solenoid 71 through an electrical voltage source 84.

Figure 4:
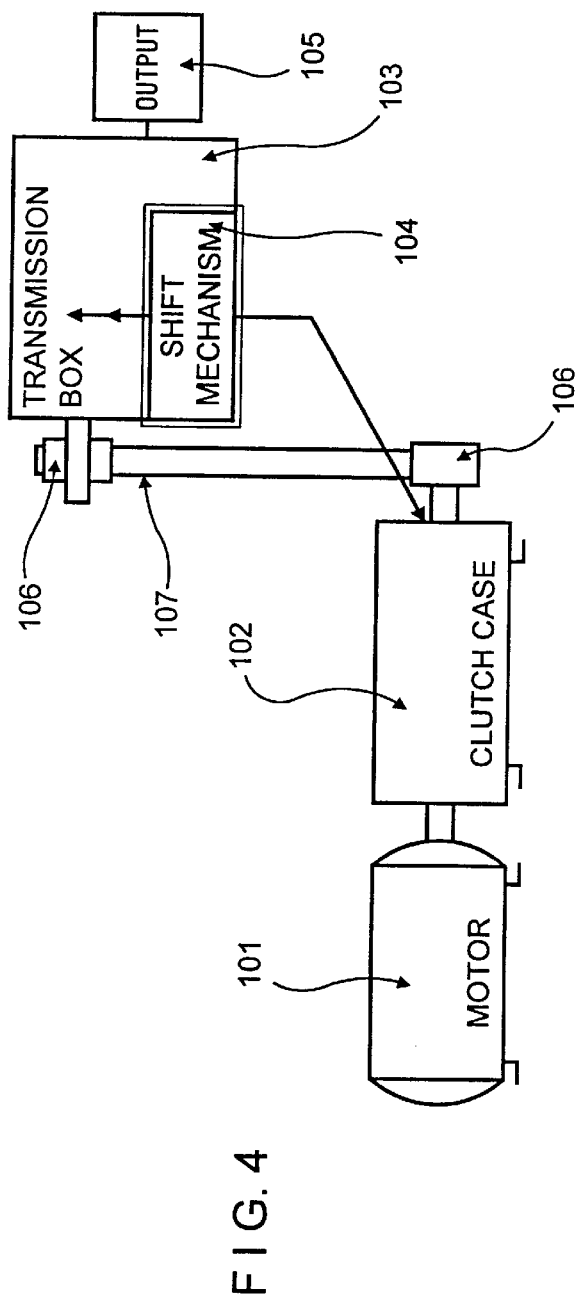
FIG. 4 diagrammatically illustrates an overall combination which includes the apparatus of the invention.

FIG. 4 shows a machine having an electric motor 101 providing power, a clutch 102 between the motor and a transmission 103 with constantly meshed gear pairs a shifting mechanism 104 and a rotation and torque output means 105. The clutch is actuated by an actuation mechanism forming part of the same shifting mechanism 104. Between the clutch 102 and the transmission 103, there is a mechanical linkage element which can be a pair of pulleys 106 coupled by a belt 107, or any other conventional rigid or elastic coupling means.

Figure 5:
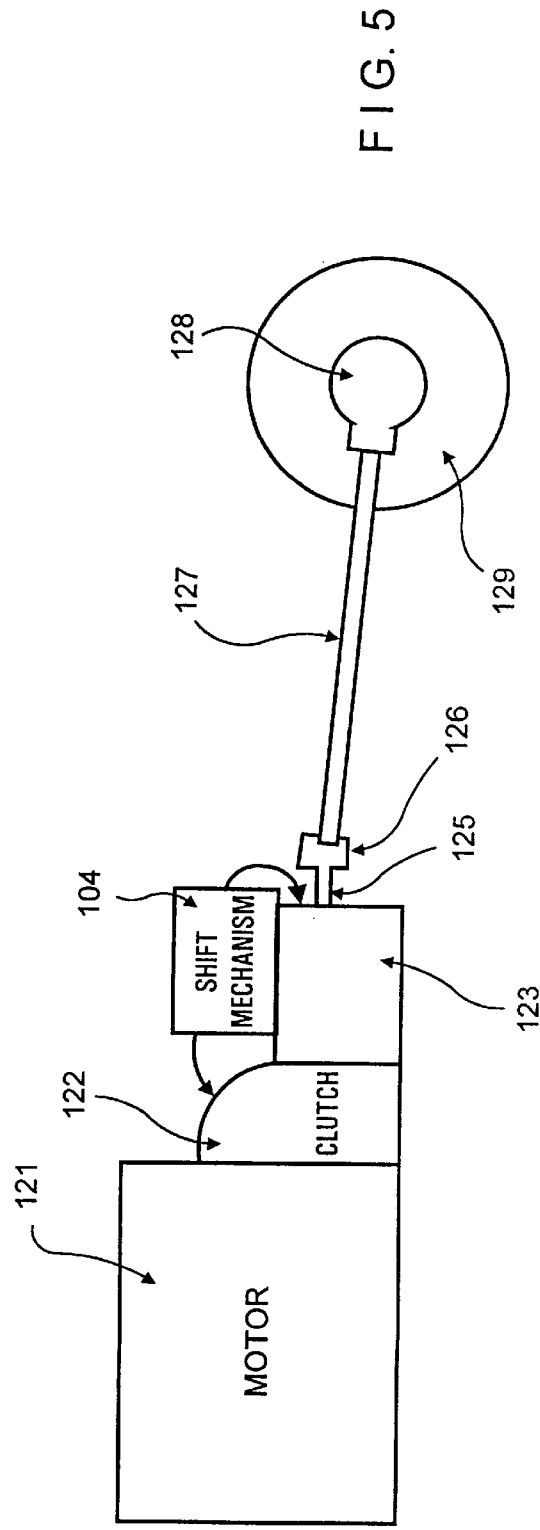
FIG. 5 diagrammatically illustrates an engine in combination with the apparatus of the invention.

FIG. 5 shows the shifting mechanism 104 mounted on an automotive vehicle provided with a clutch, the vehicle having a drive motor 121 which could be an internal combustion engine or other motor delivering power to the vehicle at variable speed. Between the motor and the transmission 123 there is the clutch 122. The transmission contains the constantly meshed gear pairs and provides the torque output for the differential 128, through a universal joint 126 and drive shaft 127. The vehicle drive wheels 129 are driven from differential 128. Although the schematic representation in FIG. 5 shows a rear wheel drive vehicle, the inventive concept is equally applicable to front wheel drive vehicles. Only the linkage between the output means 125 of the transmission 123 and differential 128 is changed.

The invention seeks to provide a construction for coupling gears so that the shifting mechanism has one of its portions, that is, the engagement and selection portions mounted internally of a shaft or mounted in more than one shaft and this mechanism is driven through a governing unit 18 automatically or manually. The mechanical portion of the shifting mechanism comprises parts mounted internally in the shaft, the actuating parts, a chain or belt transmission, and electric actuator motors. Between the electric motors and the governing unit 18, are electro-electronic devices or servo-actuators 17 providing power to the motors as the governing unit 18 sends decoded signals to these servo-actuators so that these cause the electric motors to act in a sequence provided by the logic of the governing unit.

FIG. 6 shows in a schematic way, the hierarchy of the drives. The governing unit 18 is physically constituted by electronic hardware based on microprocessor technology. The governing unit 18 has a memory containing a program (software) 18A managing all the events of driving, control, actuating and sensing for the shifting mechanism. The managing hardware and software portions 18A of the governing unit 18 in the case of the application shown in FIG. 4, can be included in a central processing unit (CPU) of a COMPUTERIZED NUMERICAL CONTROL (CNC) or inside the central processing unit of a PROGRAMMABLE LOGIC CONTROLLER (PLC) which can be fitted on the machine on which the shifting mechanism is being applied. This governing unit 18 receives pulses to operate, manually by action of the operator, through the lever 120 or other data input means, or automatically through the software 18A which is the managing program containing all the logic for automatic operation. This program is stored in the governing unit 18 and operates the electronic servo-actuator assembly 17 of the actuating motors. Each electronic servo-actuator actuates a respective motor in the following way: clutch actuating motor 33 is actuated by the electro-electronic actuator 33A (the release and engagement of the clutch can be effected by any hydraulic or pneumatic system), the synchronization actuating motor 16 is actuated by the electro-electronic actuator 16A, and the actuation motor 15 for selection of the gear pair is actuated by the electro-electronic actuator 19A. For release and engagement of the clutch and its modulation, the actuating mechanism can comprise hydraulic or pneumatic actuators, controlled by governing unit 18 with a logic suitable for the application. The engagement motor 19 as well as the entire engagement mechanism can have other constructions, such as hydraulic or pneumatic piston as in FIG. 2 or a mechanism comprising an electromagnetic solenoid and a spring as in FIG. 3. Said motors as well as the servo-actuators 17 thereof can be of electric direct current or electric alternating current type. Lastly, the system is completed in a closed loop through a set of sensors 37 for feedback of positioning, rotation and load data.

The mechanical portion of the shift mechanism 104 has three basic constructions, identical as to the location of the gear pairs, but with three variants of the engagement mechanism of the located and selected gear pairs. The variants are shown in FIGS. 1, 2A and 3A and are described hereafter.

The first embodiment of the mechanical portion of the shift mechanism 104 is disclosed in detail for selection of the gear pair or selection of speed and engagement of said speed. This first embodiment utilizes the engagement motor 19 as shown in FIG. 1.

This first embodiment comprises a locating tube 1 sliding on the hollow shaft 2 of the gears to be engaged. The constantly meshed gear pairs of the transmission 103, 123 of FIGS. 4 and 5, have one of the gears of the pairs mounted idly on the hollow shaft 2 and the corresponding gears of the constantly meshed gears mounted on a shaft 34, parallel to the hollow shaft 2, so as to rotate therewith as if the parallel shaft 34 and said gears were integral. The locating tube 1 can have at the end thereof a plurality of radial holes for example, five, the number of radial holes depending on the mechanical torque transmitted through the transmission.

Figure 7:
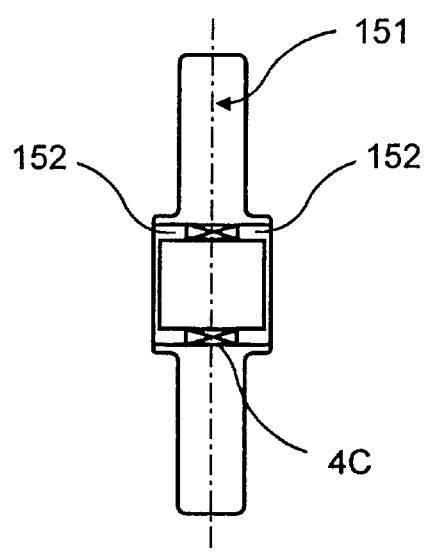
FIG. 7 is a side, elevational view of one of the gears of a gear pair of the invention.
Figure 7A:
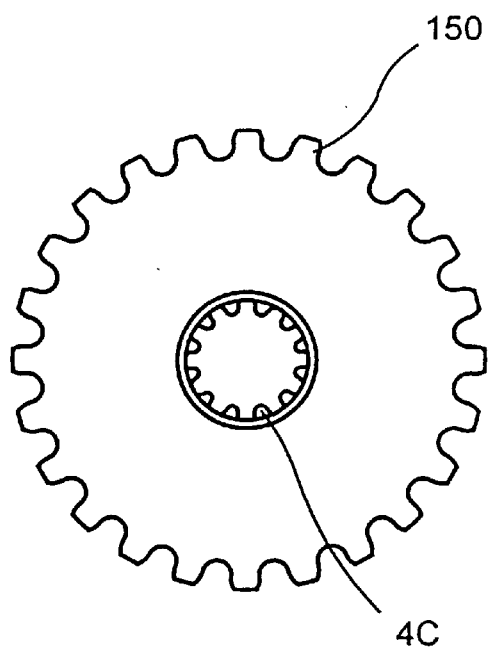
FIG. 7A is a front, elevational view of the gear in FIG. 7.

FIGS. 7, 7A show a gear which rotates idly on the hollow shaft 2 and forms part of one of the constantly meshed gear pairs of the transmission 103, 123. These gears have external teeth 150 which transmit torque and rotation. Each constantly meshed gear pair has a respective transmission ratio in conformity with the plurality of the constantly meshed gear pairs. Said gears which rotate idly on the hollow shaft 2 have internal teeth 4c which can be coupled to teeth 4a of the engagement pins 4. At both sides of internal teeth 4c, in the inner hole of the idler gear, sliding bearings 152 are disposed which allow the gear, when it is not engaged by the engagement pins 4, to rotate idly on the hollow shaft 2 with minimum friction and with minimum energy dissipation and in a balanced way since said sliding bearings 152 are mounted on both sides of the internal teeth 4c. The spacing of internal teeth 4c and the dimensions thereof permit coupling with teeth 4a of the engagement pins 4. Said gears which rotate idly on hollow shaft 2 form respective gear pairs with the gears which are engaged on the parallel shaft 34 and are constantly meshed wherewith pair by pair. Hollow shaft 2 has, for each gear of the constantly meshed gear pair which is mounted thereon, a row of radially disposed holes equally spaced and centered exactly around the radial centerline 151 of each gear mounted idly on the shaft 2. It is through these holes of the hollow shaft 2 that the engagement pins 4 will transmit torque and rotation of the hollow shaft 2 to the gear of the constantly meshed pair selected for engagement. In order to have a perfect location position in the movement of selection of the constantly meshed gear pair, the selection mechanism is provided with a positioning sensor 37b which can be linear or rotary and which senses the position of the locating tube 1 and informs the governing unit 18 so that it monitors and drives the system.

Figure 8:
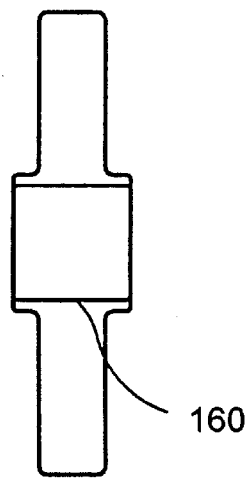
FIG. 8 is a side, elevational view of one of the gears of a gear pair according to another embodiment.
Figure 8A:
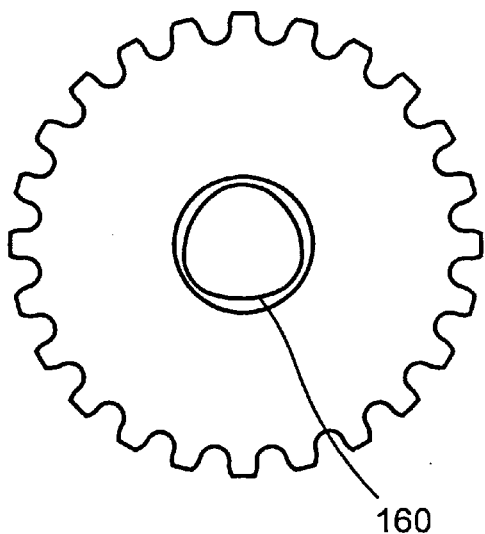
FIG. 8A is a front, elevational view of the gear in FIG. 8.

FIGS. 8, 8A show a gear engaged on the parallel shaft 34 and wherein the central hole of the gear is not circular but rather has a polygonal shape 160. In FIG. 8A, the polygonal hole 160 has three sides, but it can have four or more sides. The advantage of this system is that it does not need to use keys or internal teeth in the gear for attachment with the corresponding shaft. Parallel shaft 34 also is not circular and in the portion thereof on which the gears of the constantly meshed pairs are mounted, the shaft 34 has exactly the same outer polygonal shape 160 as the gear. Therefore, the gear and the shaft are always attached for transmitting rotation and torque. The locating tube 1 has the function of selecting the speeds or of selecting the gear pair to be engaged. In order that the locating tube 1 effects the selection, it has to slide within the hollow shaft 2 so that the centerline 151 of the radial holes which contain the engagement pins 4 is positioned in the center of the internal teeth 4c of the gear of the gear pair which will be engaged. In order that hollow shaft 2 always rotates integrally with the locating tube 1, both are attached through a key 3 permitting relative axial sliding therebetween. In the locating tube 1 the number of engagement pins 4 is the same as the number of holes, which pins serve to connect the gear of the selected pair to the hollow shaft 2 and transmit torque and rotation while all remaining gear pairs which are constantly meshed, rotate idly, that is, without transmitting rotation and torque. The engagement pins 4 as shown in FIG. 1B, are radially mounted at the end of the locating tube 1 with equal spacing as shown in FIG. 1(A)1. Engagement pins 4 have at their engaging end, teeth 4a which engage the internal teeth 4c of the selected gear. In FIGS. 1A and 1B, each engagement pin 4 is represented with only one tooth 4a, but it can be provided with one or more teeth 4a to be coupled with the internal teeth of the gears 4c. At the other end of the engagement pin 4, it has a sliding inclined plane 4b with a suitable angle to slide over an actuating tip 5. Engagement pins 4 are engaged on the actuating tip 5 by guides 6 shown in FIG. 1(C)1–1(C)3. Engagement pins 4 have slots 6A receiving the guides 6. In the clutching movement, when the engagement pins 4 are actuated outwardly against the gear internal teeth 4c, engagement pins 4 bear on the actuating tip 5. In the disengagement movement, when the engagement pins 4 move out of the internal tooth 4c, said engagement pins are pulled by the guides 6 of the actuating tip 5 through the slots 6a thereof and through the surface 6b of said slot 6a which is T-shaped. Guides 6 of the actuating tip 5 can be slipping or rolling guides. T-shaped slot 6a keeps the engagement pin 4 attached to the actuating tip 5 so that the tip 5 is extracted for disengagement. Alternatively, retracting springs can be used to retract pins 4, in which case a "T"-profile is no longer necessary. The springs are disposed in a radial fashion like the pins, always applying the retraction force on the engagement pins 4. Once the actuating tip 5 is retracted, engagement pins 4 are also retracted by the springs. When the engagement pins 4 are totally retracted with the locating tube 1, they will have a diameter smaller that the diameter of hollow shaft 2 so that they can move with locating tube 1 to select a new gear pair without said engagement pins 4 rubbing or interfering with the internal bore of hollow shaft 2 during the selection movement of locating tube 1. The selection movement is monitored by a positioning sensor 37b to ensure accuracy of said positioning. The movement of location and selection of the gear pair to be selectively engaged is made by a lug nut 7 engaged in locating tube 1 by a roller bearing 8 to cause the locating tube 1, which is rotating with hollow shaft 2, to slide within hollow shaft 2 and to selectively locate the gear of the gear pair to be engaged. Lug nut 7 does not rotate with locating tube 1 because of the roller bearing 8 but, through this roller bearing 8 axially displaces locating tube 1 to the position for selection of the particular gear pair to be engaged. The part which makes lug nut 7 slide to displace locating tube 1 into a selection position is a spindle 9 which is supported by a housing 10 of the transmission, through two roller bearings 11, 12. The spindle 9 is spline connected to a synchronizing pulley 13 or a toothed pulley which, through a synchronizing toothed belt or chain 14 is driven from a direct or alternating current servomotor 15. This motor 15 is driven by an electro-electronic apparatus for power transmission referred to as a servoactuator 15a which is schematically depicted in FIG. 6. Servo-actuator 15a actuates motor 15 to drive the belt 14 of the governing unit 18. The clutching movement or the movement of the engagement pins 4 is effected through longitudinal displacement axially of locating tube 1 and relative to this locating tube 1, of the actuating tip 5 to which engagement pins 4 are engaged through slots 6a in the bases of said engagement pins 4, by the guides 6 of said actuating tip 5. The clutching movements of said engagement pins 4 are radial and perpendicular to the axial displacement of the actuating tip 5. The actuating tip 5, besides rotating together with said locating tube 1, and being displaced within locating tube 1 axially to cause the location and selection movement, has also a relative axial movement with this locating tube 1, which axial movement is inherent to the actuating tip 5 which is independent of locating tube 1. This axial movement produces radial movement of engagement pins 4 through an end cone of the actuating tip 5 and through inclined plane 4b of the engagement pins 4. Actuating tip 5 rotates together with locating tube 1 since it is engaged therewith by engagement pins 4. The positioning accuracy of the actuating tip 5 to effect the engagement or disengagement operation is ensured by the monitoring by the positioning sensor 37a. As a first alternative, according to FIG. 1, so that the actuating tip 5 effects axial movement and promotes radial movement of engagement pins 4 into locating tube 1 and engages the gear of the selected gear pair, said actuating tip 5 is axially displaced by an extended screw 25 which is not rotated but is only axially displaced to displace actuating tip 5 through a roller bearing 31. Extended screw 25 is not rotated since it is engaged in an anchoring tube 27 through a key 27a and the anchoring tube is engaged with a cap 28 which in turn is secured to the transmission housing 10. An extended nut 24 which is mounted within locating tube 1 and axially therewith does not rotate with the tube since there is a roller bearing 30 therebetween that permits extended nut 24 to be translated axially within locating tube 1. By rotating independently of locating tube 1, extended nut 24 causes the extended screw 25 to move axially within anchoring tube 27, whereby extended screw 25 axially displaces actuating tip 5. Extended nut 24 is rotated by a turning tube 22 through key 23. Turning tube 22 has its own rotational movement. Turning tube 22 does not displace axially in relation to the transmission housing 10 since it is attached to the transmission housing 10 through roller bearing 29. Extended nut 24 is always attached to turning tube 22 through key 23 as the turning nut 24 which is mounted within locating tube 1 moves axially therewith. Extended nut 24 axially travels within turning tube 22 as locating tube 1 is displaced since extended nut 24 is attached to locating tube 1 by roller bearing 30. Turning tube 22 rotates by means of synchronizing or toothed pulley 20 which is engaged with said turning tube 22 through key 21. Synchronizing or toothed pulley 20 is driven through a synchronizing belt or chain 32 which is rotated from the direct or alternating current motor 19 through synchronizing or toothed pulley 20. Extended nut 24 rotates and thereby actuates extended screw 25 to be axially displaced rightwards or leftwards, depending upon the turning direction imposed by the direct or alternating current motor 19. Therefore, with movement of actuating tip 5 caused by the axial movement of extended screw 25 to which said actuating tip 5 is attached through roller bearing 31, engagement pins 4 engage and disengage the gear of the selected gear pair.

In a second embodiment, in accordance with FIG. 2, in order for actuating tip 5 to carry out the axial movement and produce radial movement of engagement pins 4 within locating tube 1 and engagement of the gear of the selected gear pair, the actuating tip 5 is displaced axially by an actuation piston 40 which does not rotate since it forms part of an actuation cylinder 41. The actuation piston 40 and the actuation cylinder 41 are relatively movable axially and can not rotate in relation to one another as they are engaged through a key 42. Since the actuating tip 5 is attached to engagement pins 4 and this assembly rotates with hollow shaft 2, in order for non-rotating actuation piston 40 to displace actuating tip 5, the actuation piston 40 is attached to the actuating tip 5 through roller bearing 43 which permits transmission of the axial movement from the actuation piston 40 to the actuating tip 5. Actuation piston 40 moves axially within actuation cylinder 41 by hydraulic or pneumatic action, and the actuation movement of actuation piston 40 is such that engagement pins 4 can engage teeth 4a in internal teeth 4c of the gear of the selected pair, and the hydraulic fluid or compressed air will be sent to an actuation chamber 44 of actuation cylinder 41 through actuation orifice 45 in the actuation piston 40. A deactuation chamber 46 is connected, free of pressure, to a tank or outlet 56. In order for engagement pins 4 to be retracted to disengage teeth 4a from internal teeth 4c of the gear of the previously selected gear pair, hydraulic fluid or compressed air is supplied to deactuation chamber 46 through deactuation orifice 47 in the actuation piston 40, and actuation chamber is connected, free of pressure to the tank or outlet 56. Engagement pins 4 are pulled inwardly of locating tube 1 to enable the actuating tip to be displaced for subsequent gear selection. Actuation cylinder 41 does not rotate with hollow shaft 2 but rather it is displaced axially therewith during the movement for selection of the gear pair to be operative. Actuation cylinder 41 is attached to hollow shaft 2 through roller bearings 48 which allow for relative rotation therebetween but not for relative axial movement therebetween. Actuation cylinder 41 has an extension 49 which is connected to an anchoring tube 50. Extension 49 enters and exits from anchoring tube 50 during selection movement of the gear pair and anchoring tube 50 is engaged in the housing 10 of the transmission and therefore is secured against movement. A key 51 attaches the anchoring tube 50 to extension 49 of actuation cylinder 41 whereby actuation cylinder 41 cannot rotate relative to housing 10 but is axially movable relative to housing 10. The extension 49 also houses within it, actuation and deactuation ducts 52 and 53 which carry hydraulic fluid or compressed air. Flow of compressed air or hydraulic fluid into actuation cylinder 41, to effect actuation of actuation piston 40 and consequently to effect engagement and disengagement of the selected gear pair through engagement pins 4 is achieved by actuation and deactuation ducts 52 and 53. Governing unit 18 acts on a relay and coil logic 54 which directs hydraulic fluid or compressed air from a source 55 of hydraulic fluid or compressed air to the actuation and deactuation ducts 52 and 53 with return to zero pressure, and tank 56.

As a third embodiment, according to FIG. 3, in order for actuating tip 5 to effect axial movement and produce radial movement of engagement pins 4 within locating tube 1 and engage the gear of the selected gear pair, the actuating tip 5 is axially moved by an actuation pin 70 which does not rotate since it forms part of an actuating electromagnetic solenoid 71. The actuation pin 70 and electromagnetic solenoid 71 are relatively movable only axially and are secured for common rotation by a key 72. Since actuating tip 5 is attached to engagement pins 4 and this assembly always rotates with hollow shaft 2, in order for actuating pin 70, which does not rotate, to push or pull actuating tip 5, the actuating pin 70 is attached to the actuating tip 5 through a roller bearing 73 which permits transmission of axial movement from actuating pin 70 to actuating tip 5. Actuating pin 70 moves axially within electromagnetic solenoid 71 by mechanical or magnetic action through the effect of a spring 74, and the actuation movement of actuating pin 70 pushes engagement pins 4 to engage teeth 4a in the internal teeth 4c of the gear of the selected pair. During the actuation movement coil 75 of electromagnetic solenoid 74 is deenergized, and spring 74 displaces actuating pin 70 to effect engagement movement of actuating tip 5. In the meshed gear position, with all engagement pins 4 coupled to the selected gear, actuating pin 70 is retained by the action of spring 74 and by a mechanical lock 76. In order to disengage engagement pins 4 from teeth 4a of the internal teeth 4c of the gear of the previously selected pair the coil 75 of electromagnetic solenoid 71 is energized to produce disengagement movement of actuating tip 5. The electromagnetic force induced by the coil 75 of electromagnetic solenoid 71 overcomes the force of spring 74 and the force of the mechanical lock 76 and causes engagement pins 4 to be retracted into locating tube 1, permitting the tube to be displaced to effect the selection movement of the new gear pair Electromagnetic solenoid 71 does not rotate with hollow shaft 2 but rather is displaced axially therewith during the selection movement of the gear pair Electromagnetic solenoid 71 is attached to hollow shaft 2 through two roller bearings 78 which permit relative rotation therebetween, but do not permit relative axial movement therebetween, Electromagnetic solenoid 71 has an extension 79 which is connected to an anchoring tube 80. Extension 79 enters and exits from anchoring tube 80 during the selection movement of the gear pair and anchoring tube 80 is secured to the housing 10 of the transmission. A key 81 attaches the anchoring tube 80 to extension 79 of the electromagnetic solenoid 71 whereby electromagnetic solenoid 71 cannot rotate relative to housing 10 and is capable only of relative axial movement with respect thereto. The extension 79 also contains cables 82 which will transmit the electrical current to the coil 75 of electromagnetic solenoid 71. Governing unit 18 acts on a relay logic 83 which can energize or de-energize coil 75 of electromagnetic solenoid 71 by receiving energy from an electric voltage source 84. When coil 75 is energized, actuating pin 70 overcomes the force of spring 74 and of mechanical lock 76 and disengagement is effected. Without energy from source 84 coil 75 does not act on the actuating pin 70 and therefore the spring 74 produces engagement of pins 4. In order to ensure that locating tube 1 accurately effects the location movement for speed selection, the mechanism is provided with a sensor for measuring such position so that governing unit 18 monitors and produces the correct position of speed selection. To ensure that engagement pins 4 attain the correct engagement and disengagement positions, a sensor measures the position of the engaged and disengaged pins.

Figure 9:
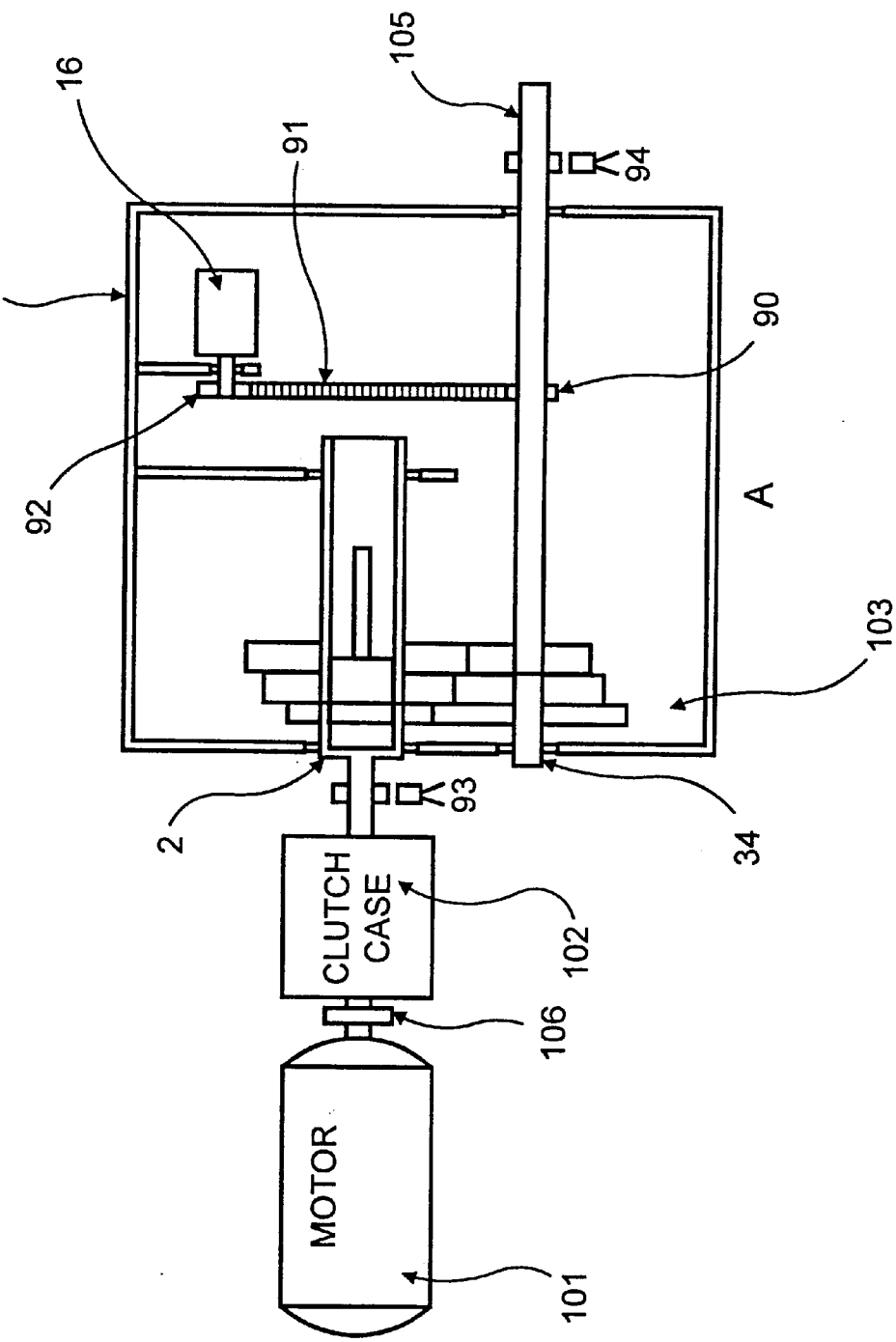
FIG. 9 diagrammatically illustrates one embodiment of a constant speed motor associated with the transmission of the invention to synchronize shifting.
Figure 9A:
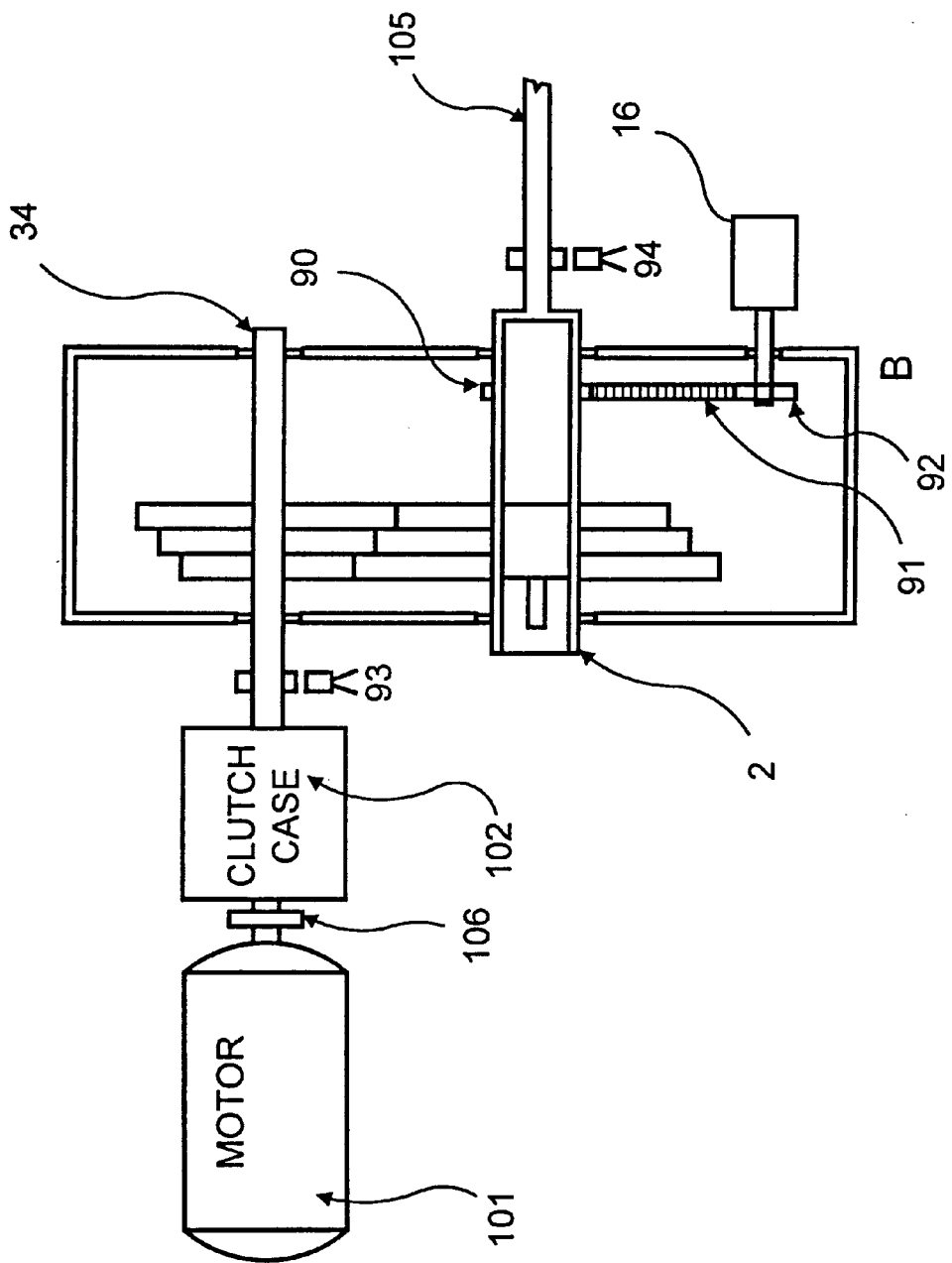
FIG. 9A diagrammatically illustrates a second embodiment of the constant speed motor with the transmission of the invention to synchronize shifting.

The present invention also concerns a synchronization system of the rotary parts driven by motor 16 in response to the electro-electronic actuator 16A according to FIGS. 1 and 6. Synchronization will depend on whether the machine has been assembled with a constant speed drive motor 101 or a variable speed drive motor 121. It will depend also on the assembly of hollow shaft 2, which contains the gear shift mechanism, as regards whether the hollow shaft 2 is mounted at the input side as shown in FIG. 9 or at the output side as shown at 105 in FIG. 9A. If, the motor 101 is of constant speed, according to FIG. 9, the motor drives the machine through clutch 102 and transmission 103 according to the following physical and mathematical relationships:

Rotation of the input shaft of the transmission: Ns

Transmission Ratio of a first gear pair: Ri

Transmission Ratio of a second gear pair: Rj

Index related to the first gear pair: (i)

Index related to the second gear pair: (j)

From the transmission equation of mechanics, we have, for a determined first pair of gears (i):

$$Nm(i)=Ns(i)xR(i)$$

For the second gear pair (j) we have:

$$Nm(j)=Ns(j)xR(j)$$

Since the motor in this case has a constant speed of rotation, then it is clear that:

$$Nm(j)=Nm(i)=Nm$$

Therefore, when shifting from the gear pair (i) to the gear pair (j), said output speeds of rotation are related by the following expression:

$$Ns(i)xR(i)=Ns(j)xR(j)$$

Then, the end output rotation speed will be:

$$Ns(j)=Ns(i)xR(i)/R(j)$$

Ns(j) differs from Ns(i) by the ratio of the transmission ratios R(i) and R(j). Therefore, synchronization motor 16 from the moment when the clutch is released and the gear pair (i) is disengaged for a speed change, the synchronization motor 16 will have to change rotation speed of the output shaft, to speed Ns(j), which was prevailing prior to releasing the clutch, which requires a speed change from Ns(i), multiplied by ratio R(i)/R(j), in a predetermined time. Therefore, the rotating masses are accelerated or decelerated as a function of ratio R(i)R(j). At the moment that rotation R(j) has been attained, speed shift takes place, that is, there is an engagement of the gear pair (i). For perfect accuracy in the operation, the input and output speeds of rotation are constantly monitored by rotation sensors 93 and 94. Independently of where hollow shaft 2 is mounted or the output rotation side 105 (FIG. 9A), the synchronism system should be mounted at the output rotation side 105, since it is at this side that the rotating masses have to be accelerated or decelerated.

Figure 10:
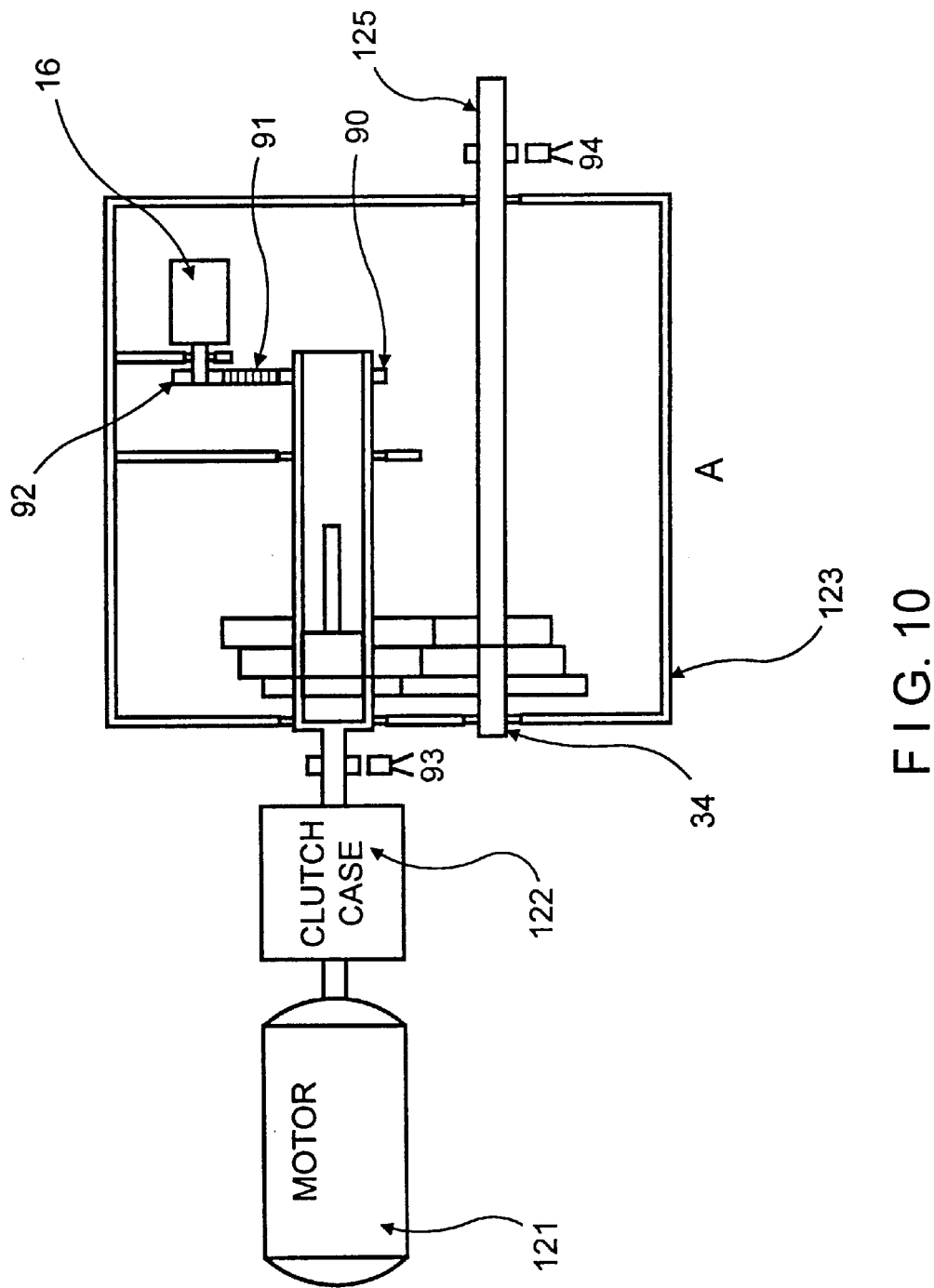
FIG. 10 diagrammatically illustrates one embodiment of a variable speed motor associated with the transmission of the invention to synchronize shifting.

If in this case, the machine motor or vehicle engine has a variable speed of rotation 121 as in FIG. 10, driving the machine or vehicle via clutch 122 and transmission 123, then we have the following equations with the variables, previously described, for a determined pair (i):

$$Nm(i)=Ns(i)xR(i)$$

For the other pair (j), we have:

$$Nm(j)=Ns(j)xR(j)$$

Since the motor has a variable speed of rotation, and assuming that in the period of time of speed shift, the rotation speed remains unchanged, then:

$$Ns(i)=Ns(j)=NS$$

Therefore, when shifting from the meshed pair (i) to meshed pair (j), said input speeds of rotation are related by the following expression:

$$Nm(i)/R(i)=Nm(j)/R(j)$$

Then, the end input rotation should be:

$$Nm(j)=Nm(i)x(R(j)/R(i))$$

Figure 10A:
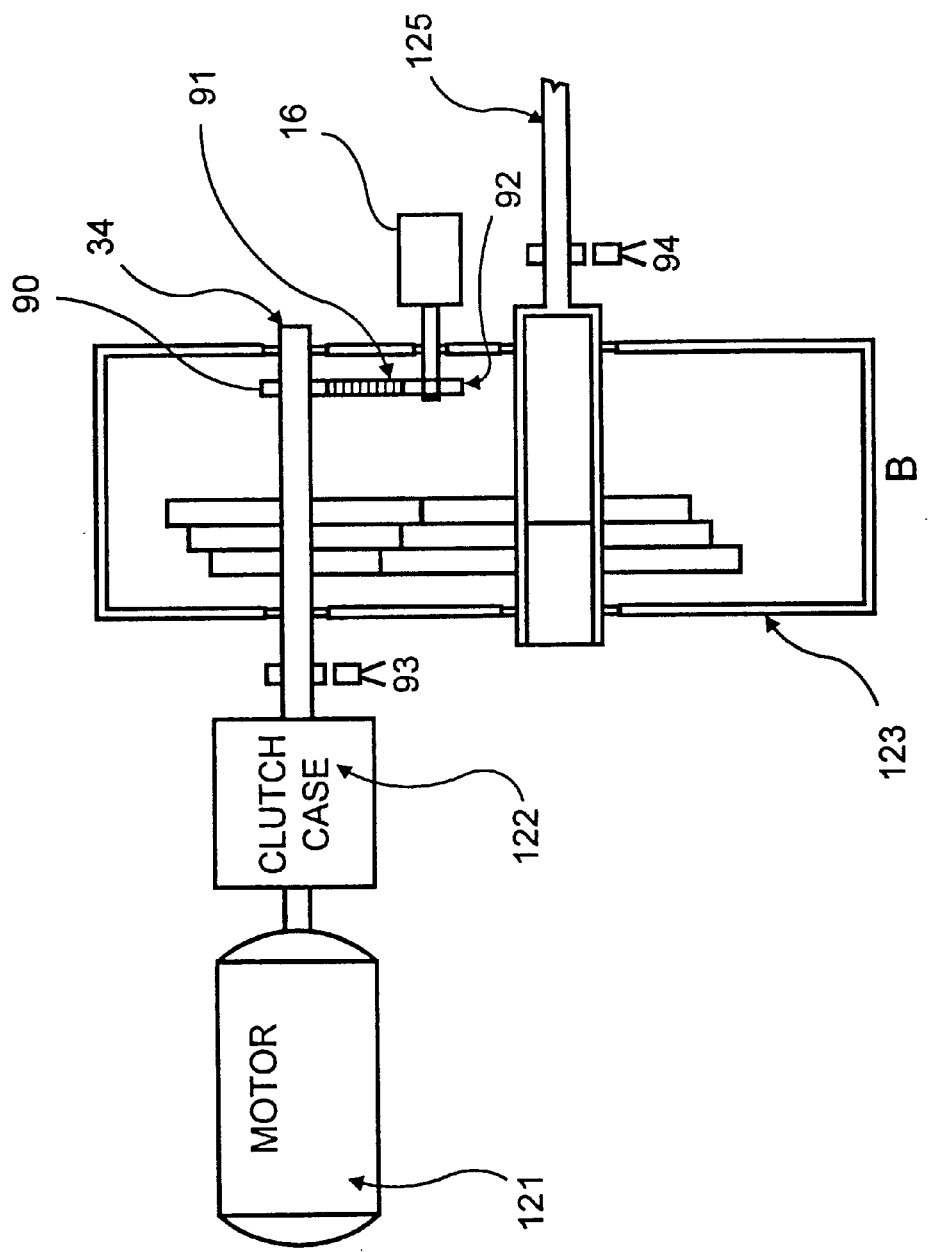
FIG. 10A diagrammatically illustrates a second embodiment of the variable speed motor with the transmission to synchronize shifting.

Nm(j) differs from Nm(i) by the inverse ratio of the transmission ratios R(i) and R(j). Therefore, the motor 16, starting from the moment in which the clutch is released and the gear pair (i) is disengaged for a speed shift, will have to cause the rotation speed of the input shaft, Nm(j), to be equal to the speed of rotation that was prevailing prior to releasing the clutch, namely, Nm(i), multiplied by the inverse ratio R(i)/R(j) in a predetermined fraction of time. Thereby, the rotating masses are decelerated or accelerated as a function of the inverse ratio R(i)/R(j). At the instant that rotation speed Nm(j) has been attained, the gear shift takes place, that is, the gear pair (j) is engaged. For perfect accuracy in the operation, the input and output speeds of rotation are constantly monitored by rotation sensors 93 and 94. Independently of where hollow shaft 2 is mounted, or of the rotation output side 125, as in FIG. 10A, or from the rotation input side, as in FIG. 10, the synchronization system must be mounted at the input side, since it is at this side that the shaft has to be accelerated or decelerated. The synchronization mechanism applied to the four disclosed embodiments is composed of direct or alternating current motor 16, driven by electro-electronic servo-actuator 16A which, in turn, is controlled by governing unit 18. The direct or alternating current motor 16 has at one shaft end thereof, toothed or synchronizing pulley 91 which, in turn, transmits rotation to the toothed or synchronizing pulley 90 which is engaged with the shaft to which acceleration or deceleration will be imparted so that synchronized rotations are achieved. It is only during such synchronization event that the direct or alternating current motor 16 will be energized and at all other times it will be off and idle.

What is claimed is:

1. A gear shift mechanism for a transmission comprising
a plurality of gear pairs selectively engageable to provide a plurality of speed ratios at an output shaft of the transmission, a mechanism for engaging selected gear pairs to change the speed ratios of the transmission, a first motor connected to said mechanism to select a particular gear pair whose speed ratio is to be adopted by the transmission, a second motor connected to said mechanism to engage said selected gear pair and provide said transmission with the speed ratio thereof, a third motor connected to drive said gear pairs during a speed change to synchronize a speed of rotation of a selected gear pair and a speed of said mechanism which engages said selected gear pair, electro-electronic servoactuator means for controlling operation of said first, second and third motors, said electro-electronic servoactuator means including a plurality of servoactuators, each connected to a respective one of said motors to operate the same, and governing means connected to said electro-electronic servoactuator means for operating said servoactuators.

2. A gear shift mechanism as claimed in claim 1, comprising a manual shift mechanism connected to operate said governing means.

3. A gear shift mechanism as claimed in claim 1, comprising an automatic control means connected to operate said governing means.

4. A gear shift mechanism as claimed in claim 1, comprising sensors to sense operation of said motors and said mechanism, said sensors providing signals for said governing unit to control operation of said servoactuators according to a programmed logic in a memory of said governing means.

5. A gear shift mechanism as claimed in claim 1, wherein said transmission is connected to a drive means via a clutch, said clutch being released during a shifting operation to disconnect said drive means from said transmission, said mechanism to change the speed ratios including actuator means operated by said second motor to selectively engage or disengage said gear pairs, said second motor operating said actuator means to disengage a previously selected gear pair during a shifting operation when said clutch is disengaged, said mechanism to change the speed ratio further including selection means operated by said first motor to select one of said gear pairs to be engaged, said third motor being operated during clutch release to drive said selected one of said gear pairs at a synchronizing speed whereupon said actuator means is operated by said second motor to engage said selected one of said gear pairs.

6. A gear shift mechanism as claimed in claim 5, wherein said transmission has input and output shafts one of which is hollow, said gear pairs including first gears mounted idly on the hollow shaft and second gears in constant mesh with said first gears and secured for rotation with the other of said shafts, said drive motor being a constant speed motor, said third motor being connected to accelerate or decelerate said output shaft when said clutch is disengaged during a shifting operation.

7. A gear shift mechanism as claimed in claim 6, wherein said hollow shaft is said input shaft and said second gears are secured on said output shaft.

8. A gear shift mechanism as claimed in claim 6, wherein said hollow shaft is said output shaft and said second gears are secured on said input shaft.

9. A gear shift mechanism as claimed in claim 5, wherein said transmission has input and output shafts one of which is hollow, said gear pairs including first gears mounted idly on the hollow shaft and second gears in constant mesh with said first gears and secured for rotation with the other of said shafts, said drive motor being a variable speed motor, said third motor being connected to accelerate or decelerate said input shaft when said clutch is disengaged during a shifting operation.

10. A gear shift mechanism as claimed in claim 9, wherein said hollow shaft is said input shaft and said second gears are secured on said output shaft.

11. A gear shift mechanism as claimed in claim 9, wherein said hollow shaft is said output shaft and said second gears are secured on said input shaft.

12. A gear shift mechanism as claimed in claim 5, wherein said transmission has input and output shafts, at least one of which is hollow, said mechanism to change the speed ratios of the transmission being in the hollow shaft, said selection means comprising a locating tube in said hollow shaft, said locating tube being secured to said hollow shaft for rotation therewith and for relative longitudinal sliding movement, said gear pairs including first gears idly mounted on said hollow shaft and second gears in constant mesh with said first gears, said locating tube having a plurality of radial holes distributed around said tube, said hollow shaft having radial holes aligned with the holes in said locating tube, an engagement pin slidably engaged in each hole for radial movement between a retracted position within said hollow shaft and an extended position protruding from said hollow shaft, said first gears having spaces distributed therearound into which the engagement pins are engaged when said pins are in the extended position, means connected to said locating tube to displace said locating tube within said hollow shaft to position said radial holes in the locating tube, along with said engagement pins therein, adjacent to the first gear of the gear pair selected for speed change, said actuator means being axially displaceable within said locating tube for engaging said engagement pins to displace the engagement pins between said retracted and extended positions respectively for releasing and engaging said pins with the selected one of said first gears.

13. A gear shift mechanism as claimed in claim 12, further comprising a positioning sensor to detect correspondence of the engaging pins and a radial centerline of the first gear of said selected pair, said positioning sensor being connected to said governing means.

14. A gear shift mechanism as claimed in claim 12, wherein said means to displace said locating tube within said hollow shaft comprises an axially displaceable lug nut connected to axially displace said locating tube and a threaded spindle driven by said first motor, said lug nut being threaded on said spindle.

15. A gear shift mechanism as claimed in claim 12, wherein said radial holes in said hollow shaft and said locating tube are equally spaced therein circumferentially.

16. A gear shift mechanism as claimed in claim 12, wherein said first gears have an inner periphery of gear shape with spaces formed between teeth of the gear shape constituting said spaces which receive said engagement pins, said engagement pins having tips shaped to fit into said spaces.

17. A gear shift mechanism as claimed in claim 12, comprising a further shaft parallel to said hollow shaft, the other of the gears of said pairs being secured for rotation on said further shaft, said further shaft having a polygonal cross section, said other of the gears of said pairs having holes of corresponding shape mounted on said further shaft, said further shaft and said output shaft being in driving relation with one another.

18. A gear shift mechanism as claimed in claim 12, wherein said actuator means comprises a member having an actuating tip engaging each of said engagement pins to radially displace said pins between said extended and retracted positions as said actuator means is axially displaced.

19. A gear shift mechanism as claimed in claim 18, wherein said actuating tip has an inclined surface facing a corresponding surface of each of said engagement pins, one of said surfaces having a slot, the other surface having a guide slidable in said slot.

20. A gear shift mechanism as claimed in claim 19, wherein said guide and slot have a T-shaped cross section such that in one direction of axial travel of said actuator means, said actuating tip pushes the engagement pins to said extended position while in the other direction of axial travel the actuating tip pulls the engagement pins to said retracted position.

21. A gear shift mechanism as claimed in claim 20, wherein said actuator means is driven by said second motor, said servoactuator which is connected to said second motor being operated by said governing means to drive said second motor in opposite directions, one for extending said engagement pins and the other for retracting said engagement pins, said actuator means further comprising an axially secured, rotatable nut driven from said second motor, and a screw secured to said actuating tip and threaded in said nut for being axially displaced as said nut rotates.

22. A gear shift mechanism as claimed in claim 18, wherein said member of said actuator means comprises a piston of a piston and cylinder means to which said actuating tip is secured.

23. A gear shift mechanism as claimed in claim 18, wherein said member of said actuator means comprises a rod of a solenoid to which said actuating tip is secured, said actuator means comprising spring means acting on said rod to urge said engagement pins to said extended position, said solenoid, when energized, displacing said rod against the action of said spring means to retract said engagement pins.

* * * * *